US012597335B2

(12) United States Patent
Kulkarni

(10) Patent No.: US 12,597,335 B2
(45) Date of Patent: Apr. 7, 2026

(54) WEARABLE DEVICE FOR EMERGENCY EVENT EVACUATION AND RESCUE

(71) Applicant: Honeywell International Inc., Charlotte, NC (US)

(72) Inventor: Sagar Ramesh Kulkarni, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 40 days.

(21) Appl. No.: 18/511,540

(22) Filed: Nov. 16, 2023

(65) Prior Publication Data

US 2025/0166487 A1 May 22, 2025

(51) Int. Cl.

| | |
|---|---|
| ***G08B 1/08*** | (2006.01) |
| ***G08B 25/10*** | (2006.01) |
| *G08B 5/38* | (2006.01) |
| *G08B 6/00* | (2006.01) |
| *G08B 17/10* | (2006.01) |

(52) U.S. Cl.

CPC ................ *G08B 25/10* (2013.01); *G08B 5/38* (2013.01); *G08B 6/00* (2013.01); *G08B 17/10* (2013.01)

(58) Field of Classification Search

CPC . G08B 25/10; G08B 5/38; G08B 6/00; G08B 17/10

USPC ........................................................ 340/539.1

See application file for complete search history.

(56) References Cited

U.S. PATENT DOCUMENTS

| | | | | |
|---|---|---|---|---|
| 10,169,972 | B1 * | 1/2019 | Long | G08B 21/0423 |
| 11,138,866 | B2 | 10/2021 | Gravel | |
| 11,218,584 | B2 | 1/2022 | Martin | |
| 11,570,607 | B2 | 1/2023 | Pellegrini | |
| 2007/0194922 | A1 | 8/2007 | Nathan et al. | |
| 2012/0154157 | A1 * | 6/2012 | George | G08B 21/02 340/584 |
| 2014/0368601 | A1 * | 12/2014 | deCharms | H04N 7/148 348/14.02 |
| 2017/0123391 | A1 * | 5/2017 | Sinha | G05B 15/02 |
| 2018/0176362 | A1 * | 6/2018 | Cohen | H04M 3/53375 |
| 2019/0082312 | A1 * | 3/2019 | Neybert | H04W 4/02 |
| 2021/0136531 | A1 * | 5/2021 | Dorian | H04W 4/90 |
| 2022/0230528 | A1 | 7/2022 | Wedig | |
| 2023/0360506 | A1 | 11/2023 | Derickson | |

FOREIGN PATENT DOCUMENTS

| | | | |
|---|---|---|---|
| CN | 105788138 | A | 7/2016 |
| KR | 20220089088 | A | 6/2022 |
| WO | 2023190703 | A1 | 10/2023 |

* cited by examiner

*Primary Examiner* — Tai T Nguyen

(74) *Attorney, Agent, or Firm* — Brooks, Cameron & Huebsch, PLLC

(57) ABSTRACT

A wearable device for emergency event evacuation and rescue is described herein. The wearable device can include a memory, and a processor configured to execute instructions stored in the memory to receive, while the wearable device is being worn by an occupant of a facility, a notification of an emergency event occurring in the facility, and transmit, responsive to receiving the notification of the emergency event occurring in the facility, a current location of the occupant in the facility and current health data of the occupant of the facility.

9 Claims, 3 Drawing Sheets

WEARABLE DEVICE FOR EMERGENCY EVENT EVACUATION AND RESCUE

TECHNICAL FIELD

The present disclosure relates generally to a wearable device for emergency event evacuation and rescue.

BACKGROUND

Large facilities (e.g., buildings), such as commercial facilities, office buildings, hospitals, and the like, may have a fire alarm system that can be triggered during an emergency event (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

When a fire or other emergency event occurs in a facility, it is important that the occupants of the facility be quickly and safely evacuated in an orderly and efficient manner. During many fires, smoke can be the greatest threat to the occupants of the facility, and the greatest obstacle to an effective evacuation. For instance, smoke inhalation can pose a significant health threat to the facility occupants. Further, smoke can make it difficult for firefighters or other emergency personnel to quickly and safely locate and rescue occupants in the facility who may be trapped or stranded.

DETAILED DESCRIPTION

Figure 1:
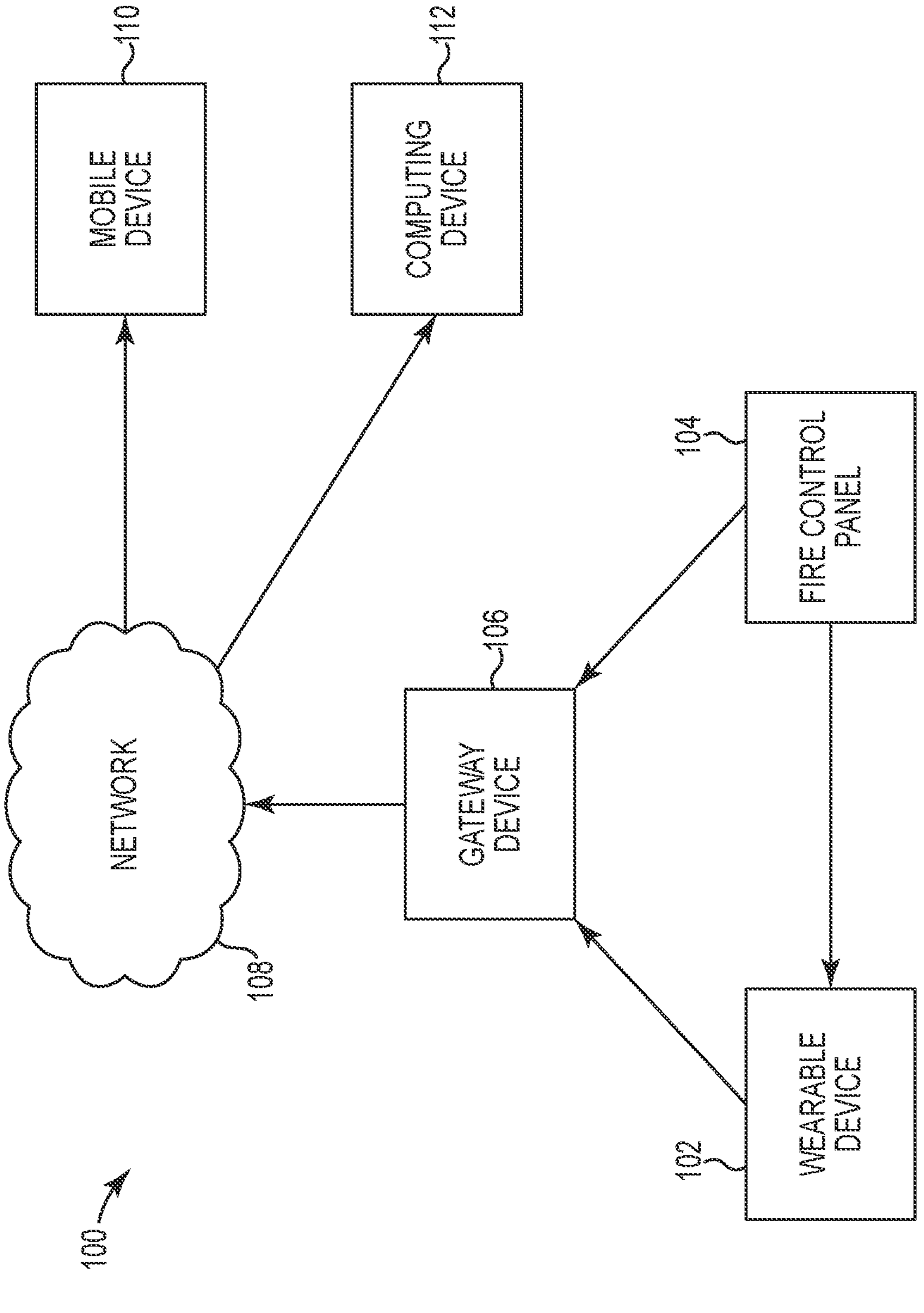
FIG. 1 illustrates an example of a fire control system in accordance with an embodiment of the present disclosure.

A wearable device for emergency event evacuation and rescue is described herein. The wearable device can include a memory, and a processor configured to execute instructions stored in the memory to receive, while the wearable device is being worn by an occupant of a facility, a notification of an emergency event occurring in the facility, and transmit, responsive to receiving the notification of the emergency event occurring in the facility, a current location of the occupant in the facility and current health data of the occupant of the facility.

A wearable device for emergency event evacuation and rescue in accordance with the present disclosure can ensure that occupants of a facility (e.g., building) can be quickly and safely evacuated and rescued in an orderly and efficient manner during a fire or other emergency event occurring in the facility. For example, a wearable device for emergency event evacuation and rescue in accordance with the present disclosure can quickly alert an occupant of the facility of the fire or other emergency event, so that the occupant is aware of the emergency event and the need to evacuate the facility.

Further, a wearable device for emergency event evacuation and rescue in accordance with the present disclosure can make it easier for firefighters and/or other emergency personnel to quickly and safely locate and rescue occupants in the facility who may be trapped or stranded during the emergency event, especially when there is smoke present in the facility. Further, a wearable device for emergency event evacuation and rescue in accordance with the present disclosure can alert the firefighters and/or other emergency personnel of facility occupants who may be having health issues and/or are unconscious (e.g., due to smoke inhalation) during the emergency event. Accordingly, a wearable device for emergency event evacuation and rescue in accordance with the present disclosure can help the firefighters and/or other emergency personnel prioritize where to go (e.g., where they are needed) in the facility during the emergency event.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3A.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates an example of a fire control system 100 in accordance with an embodiment of the present disclosure. The fire control system 100 can be the fire control system of a facility (e.g., building), such as, for instance, a large facility having a large number of floors, such as a commercial facility, office building, hospital, and the like. However, embodiments of the present disclosure are not limited to a particular type of facility.

As shown in FIG. 1, fire control system 100 can include a control panel (e.g., fire control panel) 104. Control panel 104 can be, for instance, a physical control panel, such as a control box, installed in the facility.

Control panel 104 can be used (e.g., by a user) to monitor and/or control components (e.g., devices) of fire control system 100. For instance, the user can use control panel 104 to directly control the operation of (e.g., actions performed by) the components (not shown in FIG. 1 for simplicity and so as not to obscure embodiments of the present disclosure). Further, control panel 104 can receive (e.g., collect) data, such as, for instance, real-time operational data, from the components. For instance, control panel 104 can receive the data directly from the components. Such data can include, for instance, current operational statuses, operational states, and/or properties of the components. As an additional example, control panel 104 can receive signals (e.g., alarm signals) from the components indicating that an emergency event (e.g., a fire) is occurring in the facility.

The components being monitored and/or controlled by control panel 104 can be located throughout the facility (e.g., on different floors of the facility) and can be used to detect and/or manage a fire occurring in the facility, and/or to prevent a fire from occurring in the facility. For example, such components can include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components.

As shown in FIG. 1, fire control system 100 can include a gateway device 106. Gateway device 106 can be used by a user (e.g., maintenance technician or operator) to perform inspections, maintenance, and/or upgrades, among other operations, on the components of the fire control system. For example, gateway device 106 can be connected to control panel 104, and can communicate with control panel 104 to receive the data from the components of the fire control system collected by control panel 104. In some embodiments, gateway device 106 can be permanently installed and/or connected at the facility, such that it can continuously send (e.g., push) the data collected by control panel 104 to a centralized computing device (e.g., computing device 112 illustrated in FIG. 1) for monitoring of the components of the fire control system.

As shown in FIG. 1, fire control system 100 can include a computing device 112. Computing device 112 can be located remotely from the facility and, in some embodiments, can be part of a centralized management platform. For instance, computing device 112 can be part of a distributed (e.g., cloud) computing environment. Further, computing device 112 can be the computing device of a manager of the facility.

Gateway device 106 can communicate with computing device 112 via network 108, as illustrated in FIG. 1. For example, gateway device 106 can send (e.g., continuously transmit and/or upload) the data from the components of fire control system 100 collected by control panel 104 to computing device 112.

Gateway device 106 can also communicate with mobile device 110 via network 108, as illustrated in FIG. 1. Mobile device 110 can be, for instance, a mobile device of a firefighter or other emergency personnel.

Network 108 can be a network relationship through which gateway device 106 and computing device 112 can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, network 108 can include a number of servers that receive information from, and transmit information to, gateway device 106 and computing device 112 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

A wearable device 102 for emergency event evacuation and rescue in accordance with the present disclosure is illustrated in FIG. 1. Wearable device 102 can be worn by an occupant of the facility. In some embodiments, wearable device 102 can be part of fire control system 100. In some embodiments, wearable device 102 can be a smart wearable device, such as, for instance, a watch (e.g., a smart watch). As an additional example, wearable device 102 can be a wristband, necklace, or glasses.

Wearable device 102 can receive a notification (e.g., alert) of an emergency event, such as, for instance, a fire, occurring in the facility from control panel 104. For example, control panel 104 can determine the emergency event is occurring (e.g., detect the emergency event) based on signals (e.g., alarm signals) it receives from one or more of the components of the fire control system it is monitoring and/or controlling, and send a notification of the emergency event to wearable device 102 responsive to determining the emergency event is occurring (e.g. responsive to receiving the alarm signals). Control panel 104 can send (e.g., transmit) the notification of the emergency event to wearable device 102 via Bluetooth or other wireless network (not shown in FIG. 1 for simplicity and so as not to obscure embodiments of the present disclosure), for example. Control panel 104 can also send a notification of the emergency event to gateway device 106, which in turn can send the notification to computing device 112 and/or mobile device 110 (e.g., via network 108).

Responsive to receiving the notification of the emergency event, wearable device 102 can provide an alert of the emergency event to the occupant who is wearing the wearable device. Wearable device 102 can provide the alert by, for example, causing its display to flash, causing itself to vibrate, and/or displaying a message about the emergency event. The message can include a visual icon and/or text that indicates the type of emergency event. For instance, if the emergency event is a fire, the visual icon can be a flame, and the text can be "fire alarm".

Responsive to receiving the notification of the emergency event, wearable device 102 can determine the current (e.g., real-time) location of the occupant in the facility, and transmit the current location of the occupant in the facility to gateway device 106. Wearable device 102 can transmit the current location of the occupant to gateway device 106 via Bluetooth or other wireless network (not shown in FIG. 1 for simplicity and so as not to obscure embodiments of the present disclosure), for example. Wearable device 102 can determine the current location of the occupant in the facility using, for example, Bluetooth beacons installed in the facility or Global Positioning System (GPS).

Responsive to receiving the notification of the emergency event, wearable device 102 can determine (e.g., measure) current (e.g., real-time) health data of the occupant of the facility, and transmit the current health data of the occupant in the facility to gateway device 106. For instance, wearable device 102 can transmit the current health data of the occupant of the facility to gateway device 106 concurrently with the current location of the occupant in the facility. Wearable device 102 can transmit the current health data of the occupant to gateway device 106 via Bluetooth or other wireless network (not shown in FIG. 1 for simplicity and so as not to obscure embodiments of the present disclosure), for example. The current health data of the occupant can include and/or indicate, for example, the heart rate and/or pulse of the occupant, the block oxygen level of the occupant, and/or whether the occupant is unconscious.

Responsive to receiving the current location of the occupant in the facility and the current health data of the occupant of the facility, gateway device can transmit (e.g., via network 108) the current location and current health data of the occupant to mobile device 110 and/or computing device 112. That is, mobile device 110 and/or computing device 112 can receive the current location of the occupant in the facility and the current health data of the occupant of the facility from wearable device 102 via gateway device 106.

Although a single wearable device is illustrated in FIG. 1 for simplicity, embodiments of the present disclosure can include a plurality of wearable devices each analogous to wearable device 102 illustrated in FIG. 1. For example, a wearable device analogous to wearable device 102 can be worn by each respective one of a plurality of occupants of the facility, and can receive a notification (e.g., alert) of an emergency event (e.g., a fire) occurring in the facility from control panel 104, in a manner analogous to wearable device 102. Responsive to receiving the notification of the emergency event, each respective wearable device can provide an alert of the emergency event to the occupant who is wearing that wearable device, determine the current (e.g., real-time) location of the occupant in the facility and health data of the occupant, and transmit the current location of the occupant in the facility and health data of the occupant to gateway device 106, in a manner analogous to wearable device 102. Responsive to receiving the current location of each respective occupant in the facility and the current health data of each respective occupant of the facility from the wearable devices, gateway device can transmit (e.g., via network 108) the current location and current health data of each respective occupant to mobile device 110 and/or computing device 112.

Mobile device 110 and/or computing device 112 can display (e.g., on a user interface) the current location of each respective occupant in the facility and the current health data of each respective occupant of the facility received from the wearable devices. For example, the current location of each respective occupant in the facility can be displayed (e.g., represented) as a dot in a floor plan of the facility displayed on the user interface of mobile device 110 and/or computing device 112. The color of each respective dot displayed in the floor plan can correspond to the current health data of the facility occupant whose current location is represented by that dot. For instance, an occupant whose current health data is abnormal (e.g., bad) and/or indicates they are unconscious may be represented by a red dot, and an occupant whose current health data is normal (e.g., good) and indicates they are conscious may be represented by a green dot.

As an additional example, the floor plan can include (e.g., display) a plurality of areas (e.g., zones) of a facility, and the color of each respective area displayed in the floor plan can correspond to the quantity (e.g., density) of occupants currently located in that respective area. For example, zones in which a relatively larger quantity of occupants are currently located can be displayed (e.g., highlighted or shaded) in red, zones in which a relatively smaller quantity of occupants are currently located can be displayed in yellow, and zones in which no occupants are currently located can be displayed in green.

If the current location of an occupant in the facility and/or the current health of an occupant in the facility changes during the emergency event, that change can be received from the wearable device being worn by that occupant, and mobile device 110 and/or computing device 112 can update the display to indicate (e.g., reflect) that change. For example, if an occupant moves to a different area (e.g., different zone) of the facility during the emergency event, the dot representing the current location of that occupant can move to that area in the floor plan in the display. As an additional example, if an occupant becomes unconscious during the emergency event, the color of the dot representing that occupant in the display can change (e.g., from green to red). As an additional example, if a relatively large quantity of occupants move to a different area of the facility during the emergency event, the color of that area in the floor plan in the display can change (e.g., from green or yellow to red).

In some embodiments, mobile device 110 and/or computing device 112 can determine and display directions to the current location of the occupant in the facility. For instance, the directions can be displayed (e.g., embedded) in the floor plan, and/or can be determined from the current location of the firefighter or other emergency personnel.

Figure 2:
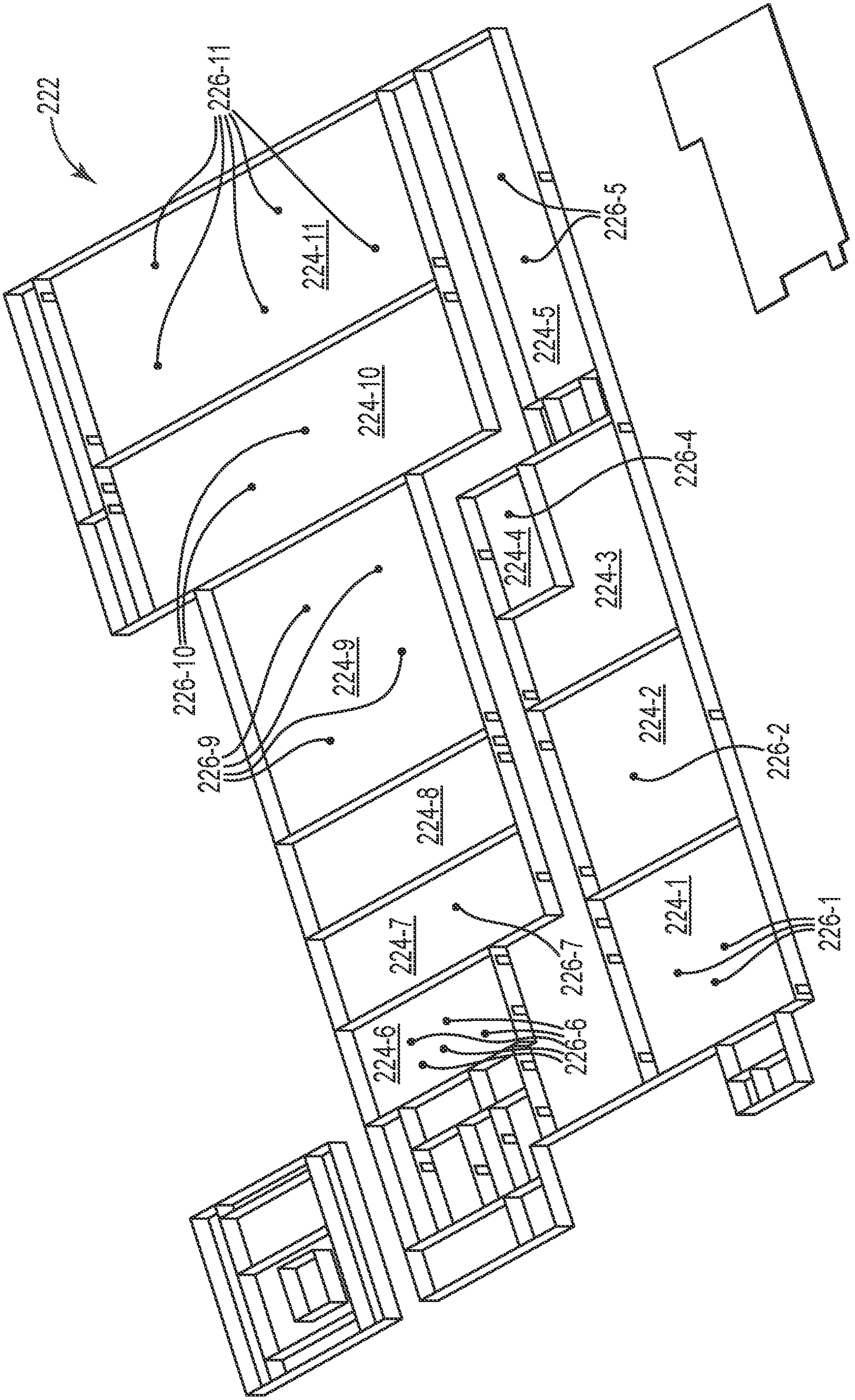
FIG. 2 illustrates an example of a display of the current location of a plurality of occupants in a facility and the current health data of the plurality of occupants of the facility received from wearable devices during an emergency event in accordance with an embodiment of the present disclosure.

FIG. 2 illustrates an example of a display 222 of the current location of a plurality of occupants in a facility and the current health data of the plurality of occupants of the facility received from wearable devices (e.g., wearable devices analogous to wearable device 102 previously described in connection with FIG. 1) during an emergency event in accordance with an embodiment of the present disclosure. Display 222 can be provided on a user interface of mobile device 110 and/or computing device 112 previously described in connection with FIG. 1.

As shown in FIG. 2, display 222 includes a floor plan of the facility. As shown in FIG. 2, the floor plan can include (e.g., be divided into) a plurality of areas (e.g., zones) 224-1, 224-2, 224-3, . . . , 224-10, 224-11 (which may be collectively referred to herein as areas 224), which can each correspond to a different area of the facility. In the example illustrated in FIG. 2, a single level (e.g., floor) of the facility is displayed in the floor plan, and a user could select different levels (e.g., different floors) to be displayed via a menu or other visual icon in the display (not shown for simplicity and so as not to obscure embodiments of the present disclosure). The floor plan can be retrieved, for example, from a building management system (BMS) associated with the facility.

As shown in FIG. 2, the current location of each respective occupant in the facility can be displayed (e.g., represented) as a different respective dot in the floor plan that corresponds to the current location of that occupant in the facility. For instance, in the example illustrated in FIG. 2, three occupants are currently located in area 224-1 of the facility, and those three occupants are represented as dots 226-1. Further, one occupant is currently located in each of areas 224-2, 222-4, and 226-7 of the facility, and those occupants are represented as dots 226-2, 226-4, and 226-7, respectively. Further, two occupants are currently located in area 224-5 of the facility, and those two occupants are represented as dots 226-5. Further, five occupants are currently located in area 224-6 of the facility, and those five occupants are represented as dots 226-6. Further, four occupants are currently located in area 224-9 of the facility, and those four occupants are represented as dots 226-9. Further, two occupants are currently located in area 224-10 of the facility, and those two occupants are represented as dots 226-10. Further, five occupants are currently located in area 224-11 of the facility, and those five occupants are represented as dots 226-11. Further, no occupants are currently located in areas 224-3 or 224-8, and as such no dots are shown in those areas. The current location of each respective occupant in the facility can be determined by, and received from, a wearable device (e.g., wearable device 102) being worn by each respective occupant, as previously described herein.

Although not shown in FIG. 2 for clarity and so as not to obscure embodiments of the present disclosure, the color of each respective area 224 displayed in the floor plan can correspond to the quantity (e.g., density) of occupants currently located in that respective area. For instance, in the example illustrated in FIG. 2, a relatively larger quantity of occupants are currently located in areas 226-6, 226-9, and 226-11 as compared to the other areas, and as such areas 226-6, 226-9, and 226-11 can be displayed (e.g., highlighted or shaded) in red. Further, a relatively smaller (e.g., less than areas 226-6, 226-9, and 226-11) quantity of occupants are currently located in areas 226-1, 226-2, 226-4, 226-5, 226-7, and 226-10, and as such those areas can be displayed in yellow. Further, no occupants are currently located in areas 224-3 or 224-8, and as such those areas can be displayed in green.

Although not shown in FIG. 2 for clarity and so as not to obscure embodiments of the present disclosure, the color of each respective dot displayed in the floor plan can correspond to the current health data of the occupant whose current location is represented by that dot. For instance, if the current health data of one of the occupants who is currently located in area 224-1 is abnormal (e.g., bad) and/or indicates that occupant is unconscious, then the color of dot 226-1 representing that occupant may be red. Further, if the current health data of another one of the occupants who is currently located in area 224 is normal (e.g., good), then the color of dot 226-1 representing that occupant may be green. The current health data of each respective occupant in the facility can be determined by, and received from, a wearable device (e.g., wearable device 102) being worn by each respective occupant, as previously described herein.

If the current location of an occupant in the facility and/or the current health of an occupant in the facility changes during the emergency event, that change can be received from the wearable device being worn by that occupant, and display 222 can be updated to indicate (e.g., reflect) that change. For example, if one of the occupants who is currently located in area 224-1 moves to area 224-2, the dot 226-1 representing the current location of that occupant can move to area 224-2. As an additional example, if one of the occupants who is currently located in area 224-1 becomes unconscious, the color of the dot 226-1 representing that occupant can change (e.g., from green to red). As an additional example, if all of the occupants who are currently located in area 224-1 move to area 224-2, the color of area 224-2 can change (e.g., from yellow to red).

Figure 3A:
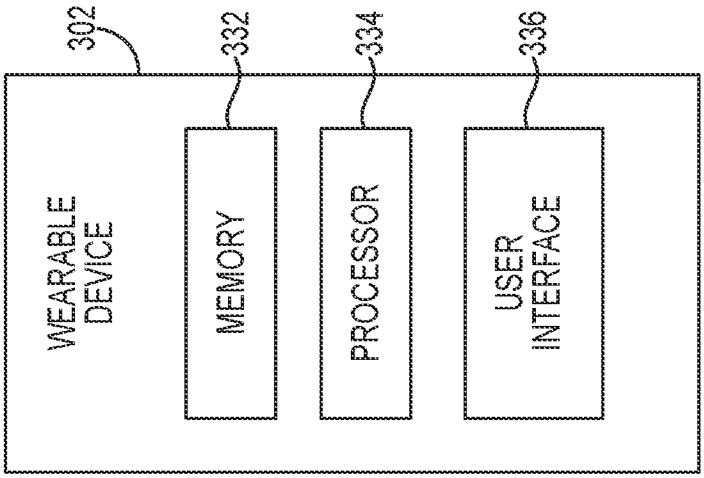
FIG. 3A illustrates a block diagram of a wearable device for emergency event evacuation and rescue in accordance with an embodiment of the present disclosure.
Figure 3B:
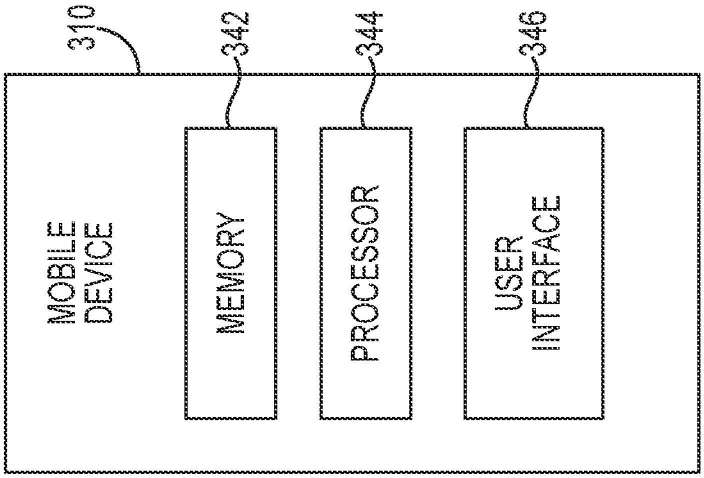
FIG. 3B illustrates a block diagram of a mobile device for emergency event evacuation and rescue in accordance with an embodiment of the present disclosure.
Figure 3C:
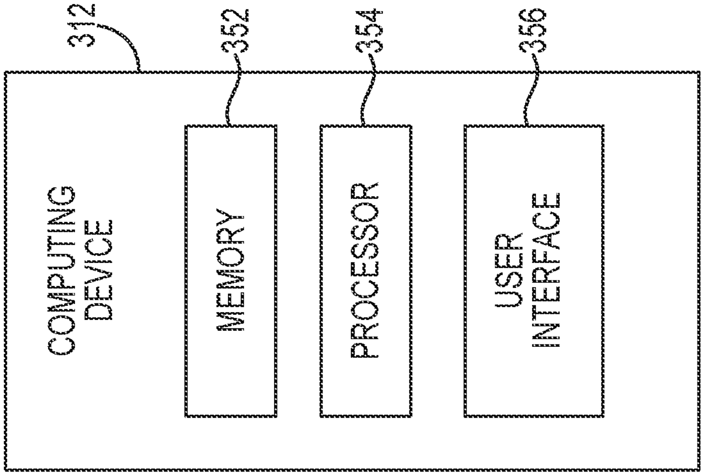
FIG. 3C illustrates a block diagram of a computing device for emergency event evacuation and rescue in accordance with an embodiment of the present disclosure.

FIG. 3A illustrates a block diagram of a wearable device 302 for emergency event evacuation and rescue in accordance with an embodiment of the present disclosure. FIG. 3B illustrates a block diagram of a mobile device 310 for emergency event evacuation and rescue in accordance with an embodiment of the present disclosure. FIG. 3C illustrates a block diagram of a computing device for emergency event evacuation and rescue in accordance with an embodiment of the present disclosure. Wearable device 302, mobile device 310, and computing device 312 can be, for example, wearable device 102, mobile device 110, and computing device 112, respectively, previously described in connection with FIG. 1.

As shown in FIG. 3A, wearable device 302 can include a memory 332 and a processor 334. As shown in FIG. 3B, mobile device 310 can include a memory 342 and a processor 344. As shown in FIG. 3C, computing device 312 can include a memory 352 and a processor 354.

The memories 332, 342, and 352 can be any type of storage medium that can be accessed by processors 334, 344, and 354, respectively, to perform various examples of the present disclosure. For example, the memories 332, 342, and 352 can each be a non-transitory computer readable medium having computer readable instructions (e.g., computer program instructions) stored thereon that are executable by the processors 334, 344, and 354, respectively, for emergency event evacuation and rescue in accordance with the present disclosure.

The memories 332, 342, and 352 can be volatile or nonvolatile memory. The memories 332, 342, and 352 can also be removable (e.g., portable) memory, or non-removable (e.g., internal) memory. For example, the memories 332, 342, and 352 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memories 332, 342, and 352 are illustrated as being located within wearable device 302, mobile device 310, and computing device 312, respectively, embodiments of the present disclosure are not so limited. For example, memories 332, 342, and/or 352 can also be located internal to another computing resource (e.g., enabling computer readable instructions to be downloaded over the Internet or another wired or wireless connection).

As shown in FIG. 3A, wearable device 302 can include a user interface 336. As shown in FIG. 3B, mobile device 310 can include a user interface 346. As shown in FIG. 3C, computing device 312 can include a user interface 356.

A user of wearable device 302, mobile device 310, and computing device 312 can interact with those respective devices via user interface 336, user interface 346, and user interface 356, respectively. For example, the user interface 336 can provide (e.g., display and/or present) information to the user of wearable device 302, and/or receive information from (e.g., input by) the user of wearable device 302. Further, the user interface 346 can provide information to the user of mobile device 310, and/or receive information from the user of mobile device 310. Further, the user interface 356 can provide information to the user of computing device 312, and/or receive information from the user of computing device 312.

For instance, in some embodiments, user interface 336, user interface 346, and/or user interface 356 can be a graphical user interface (GUI) that can provide and/or receive information to and/or from the users of wearable device 302, mobile device 310, and computing device 312, respectively. For example, user interface 336 can provide an alert of an emergency event to a user (e.g., facility occupant) who is wearing the wearable device, as previously described herein. Further, user interfaces 346 and/or 356 can display the current location of each respective occupant in a facility and the current health data of each respective occupant of the facility received from wearable devices being worn by the occupants, as previously described herein. The displays can each be, for instance, a touch-screen (e.g., the GUI can include touch-screen capabilities).

The user interfaces 336, 346, and 356 can each be localized to any language. For example, the user interfaces 336, 346, and 356 can each display information in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A wearable device, comprising:

a memory; and a processor configured to execute instructions stored in the memory to:

receive, while the wearable device is being worn by an occupant of a facility, a notification of an emergency event occurring in the facility;

measure, responsive to receiving the notification of the emergency event occurring in the facility, current health data of the occupant of the facility; and transmit, responsive to receiving the notification of the emergency event occurring in the facility:

a current location of the occupant in the facility; and the current health data of the occupant of the facility.

2. The wearable device of claim 1, wherein the processor is configured to execute the instructions to provide an alert to the occupant of the emergency event occurring in the facility responsive to receiving the notification of the emergency event occurring in the facility.

3. The wearable device of claim 2, wherein providing the alert comprises causing a display of the wearable device to flash.

4. The wearable device of claim 2, wherein providing the alert comprises causing the wearable device to vibrate.

5. The wearable device of claim 2, wherein providing the alert comprises displaying a message about the emergency event.

6. The wearable device of claim 1, wherein the processor is configured to execute the instructions to receive the notification of the emergency event from a fire control panel of the facility.

7. The wearable device of claim 1, wherein the processor is configured to execute the instructions to transmit the current location of the occupant in the facility and the current health data of the occupant of the facility to a gateway device of a fire alarm system of the facility.

8. The wearable device of claim 1, wherein the processor is configured to execute the instructions to determine the current location of the occupant in the facility.

9. The wearable device of claim 1, wherein the wearable device is a smart watch.

* * * * *